Sept. 4, 1951  A. R. CUNNINGHAM  2,566,556
DUMP VEHICLE CONSTRUCTION
Filed April 14, 1947  5 Sheets-Sheet 1
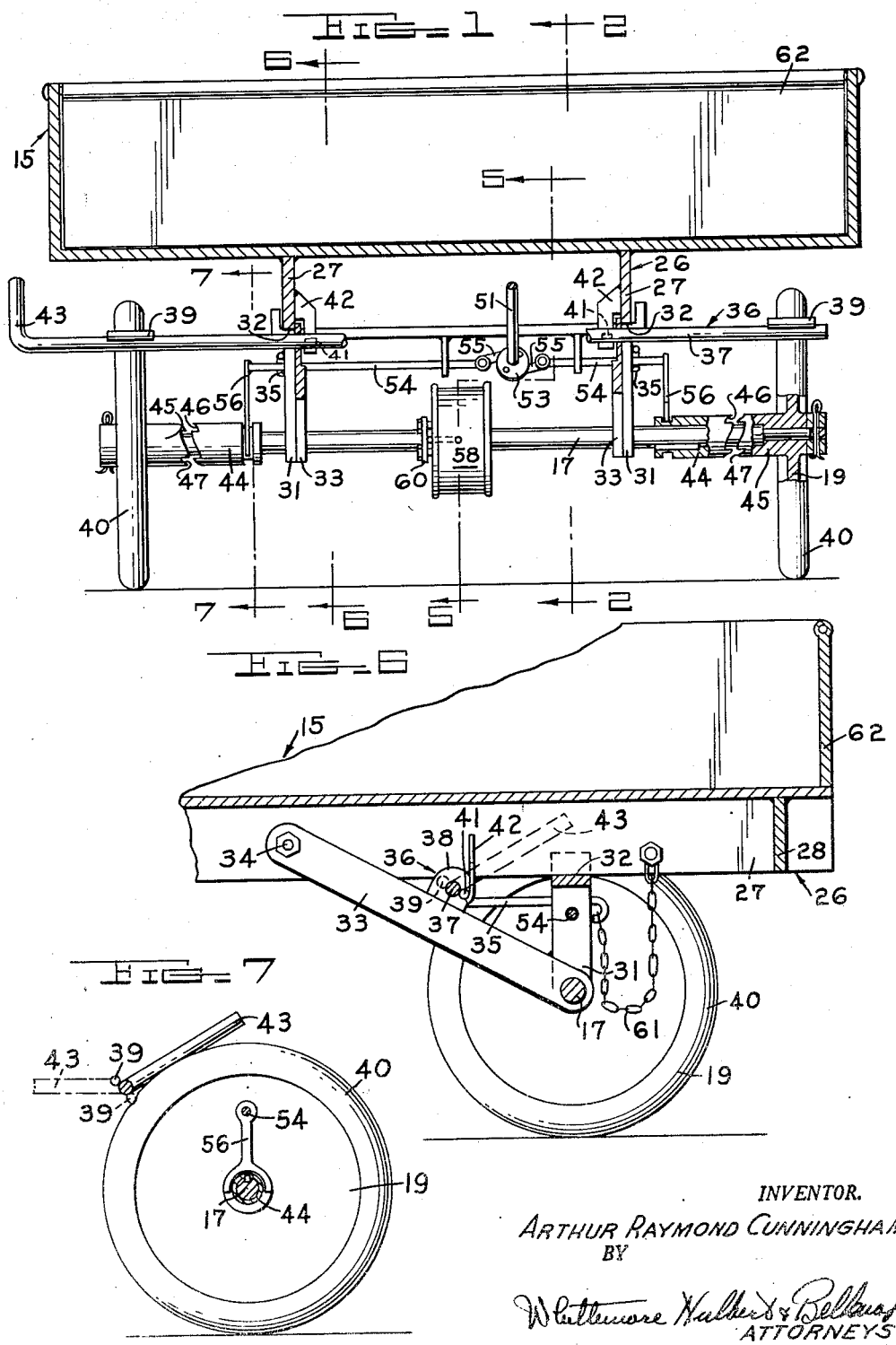
INVENTOR.
ARTHUR RAYMOND CUNNINGHAM
BY
Whittemore Hulbert & Belknap
ATTORNEYS

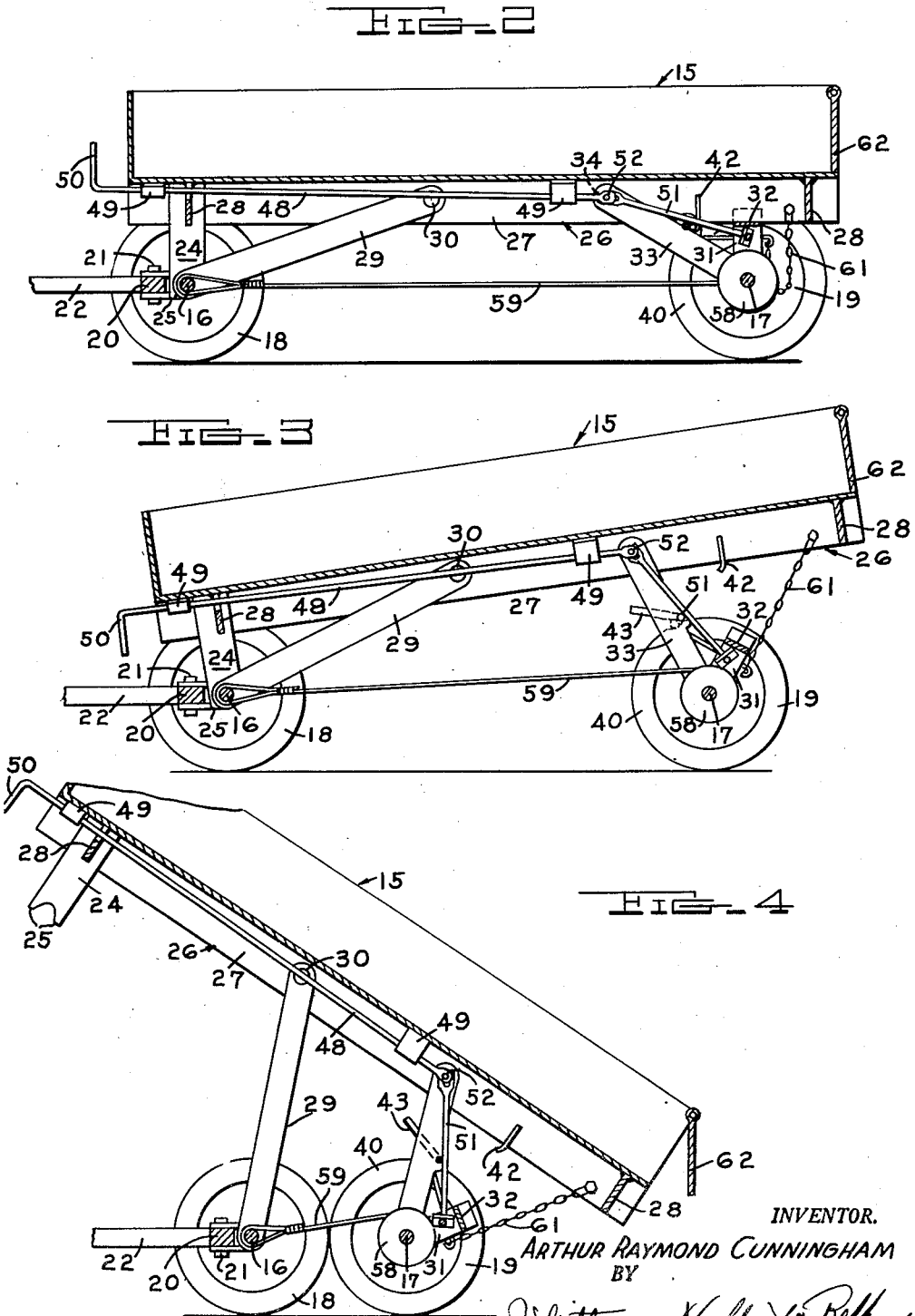

Sept. 4, 1951         A. R. CUNNINGHAM         2,566,556
DUMP VEHICLE CONSTRUCTION
Filed April 14, 1947                    5 Sheets-Sheet 3
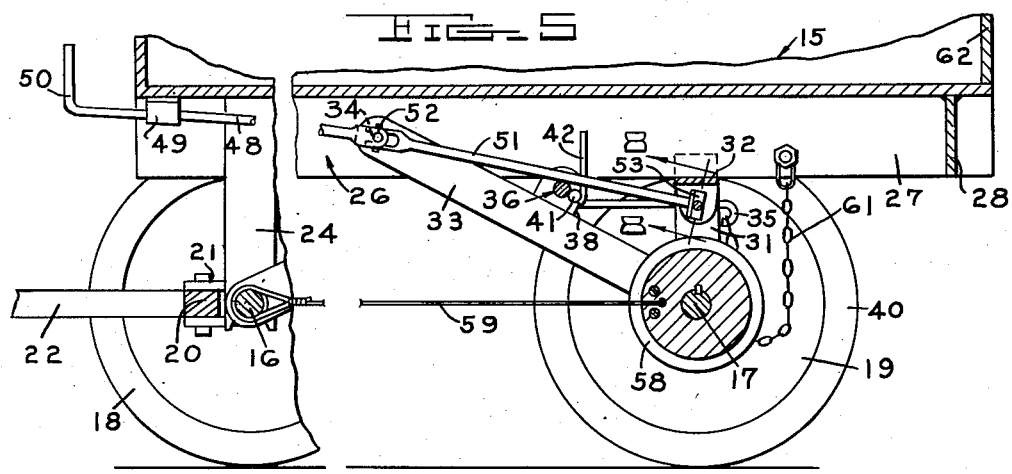
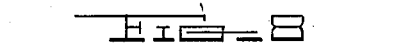
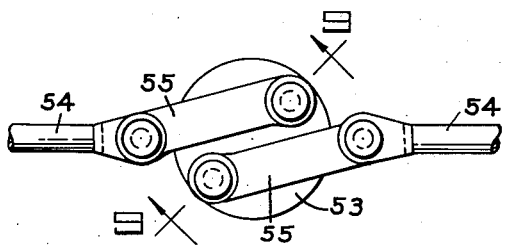
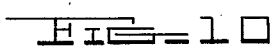
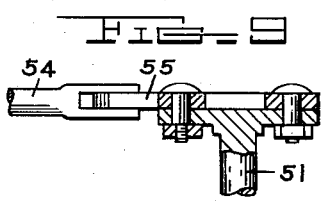
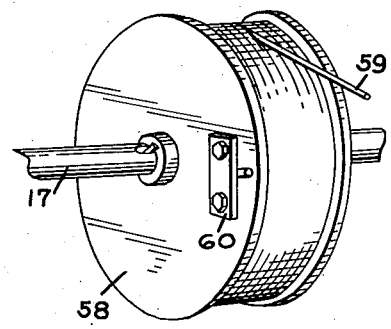
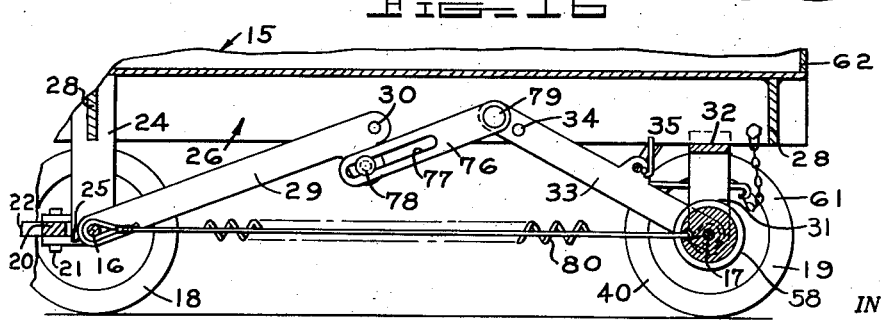
INVENTOR.
ARTHUR RAYMOND CUNNINGHAM
BY
Whittemore Hulbert & Belknap
ATTORNEYS

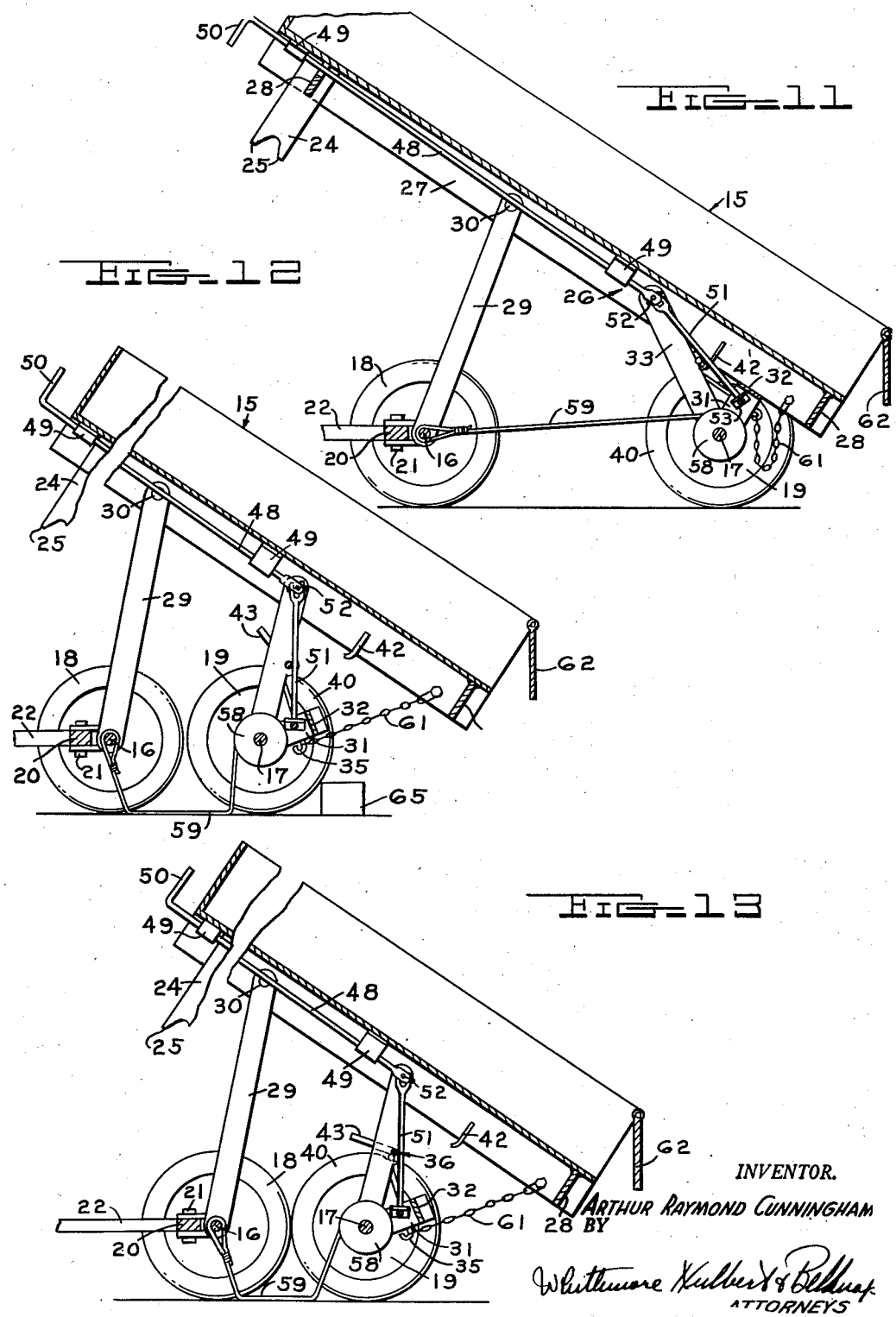

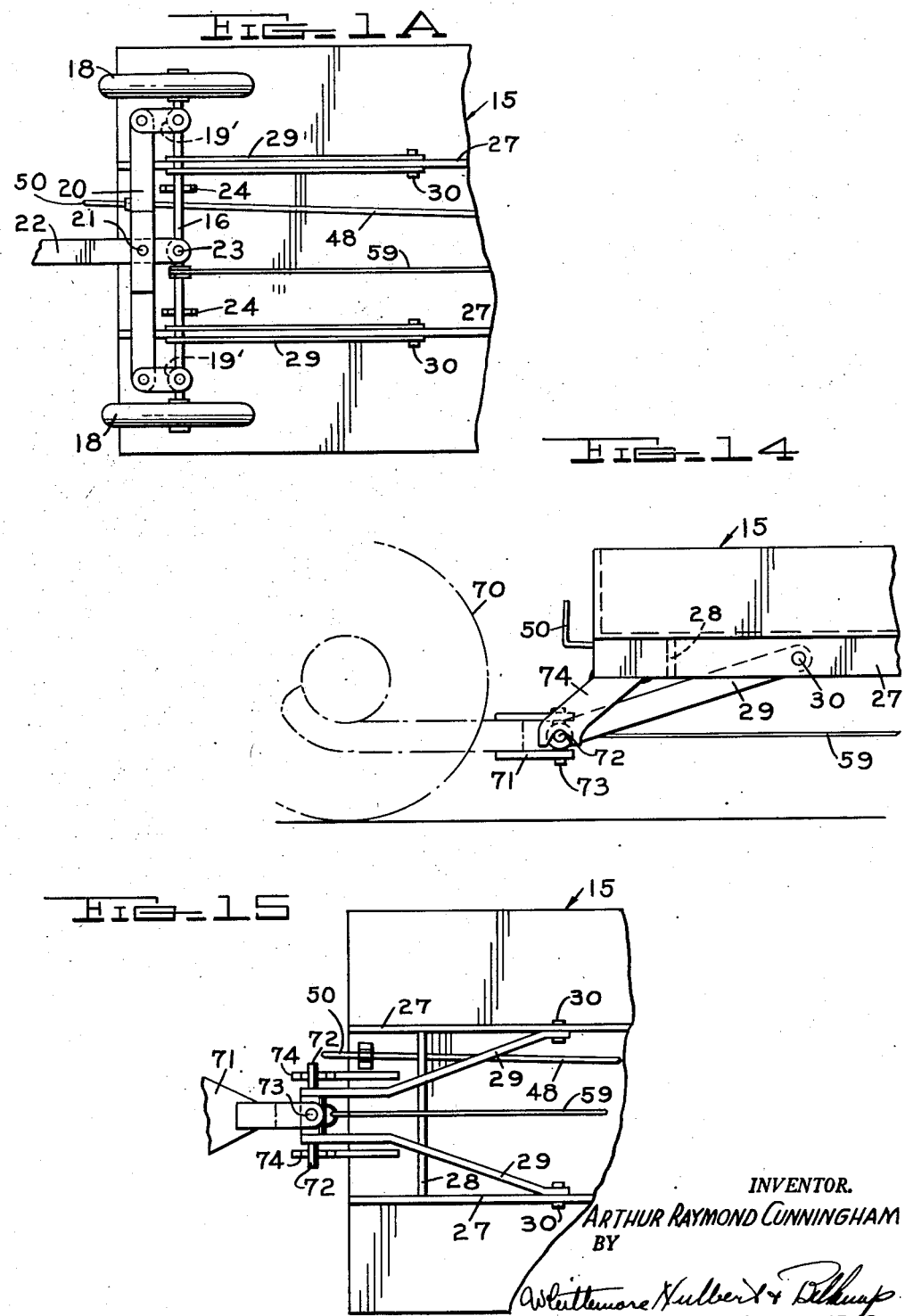

Patented Sept. 4, 1951

2,566,556

UNITED STATES PATENT OFFICE 2,566,556

DUMP VEHICLE CONSTRUCTION

Arthur Raymond Cunningham, Detroit, Mich.

Application April 14, 1947, Serial No. 741,372

13 Claims. (Cl. 298—20)

This invention relates generally to vehicles having load supporting bodies and refers more particularly to improvements in vehicles such, for example, as wagons having bodies adapted to be tilted or dumped to dispense the load.

An object of this invention is to provide a vehicle having a load carrying body supported at opposite ends on front and rear axles equipped with ground engaging wheels and having means responsive to reverse rotation of the rear axle to swing the front end of the body upwardly sufficiently to enable dispensing the load from the rear end of the body by the action of gravity.

Another object of this invention is to provide a vehicle of the above general type wherein the ground engaging wheels on the rear axle are freely rotatably mounted thereon and wherein means is provided under control of the operator for connecting the rear wheels to the axle.

Still another feature of this invention is to provide a drum on the rear axle connected to the front axle by a flexible linear member in a manner such that the front axle with the ground engaging wheels thereon is pulled rearwardly toward the rear axle upon rotation of the latter and drum in a reverse direction.

A further object of this invention is to provide a connection between the front axle and body responsive to rearward movement of the front axle to swing the front end of the body upwardly.

A still further object of this invention is to provide means for elevating the rear end of the body relative to the rear axle prior to swinging the front end of the body upwardly. This arrangement is especially advantageous in instances where greater clearance between the ground and rear end of the body is required in the tilted position of the body.

The foregoing as well as other objects will be made more apparent as this description proceeds, especially when considered in connection with the accompanying drawings, wherein:

Figure 1 is a cross sectional view through a vehicle embodying the features of this invention;

Figure 1A is a fragmentary bottom plan view of the vehicle;

Figure 2 is a longitudinal sectional view taken substantially on the plane indicated by the line 2—2 of Figure 1;

Figure 3 is a view similar to Figure 2 showing the parts in a different position;

Figure 4 is also a view similar to Figure 2 showing the parts in still another position;

Figures 5, 6 and 7 are respectively sectional views taken substantially on the lines 5—5, 6—6 and 7—7 of Figure 1;

Figure 8 is a sectional view taken on the line 8—8 of Figure 5;

Figure 9 is a sectional view taken on the line 9—9 of Figure 8;

Figure 10 is a perspective view of a part of the body dumping mechanism;

Figures 11, 12 and 13 are respectively longitudinal sectional views showing the dumping mechanism for the body in different relative positions;

Figure 14 is a fragmentary side elevational view of a modified form of the invention;

Figure 15 is a plan view partly in section of the construction shown in Figure 14; and Figure 16 is a semi-diagrammatic side elevational view showing still another embodiment of this invention.

For the purpose of illustrating the present invention, I have selected a farm type wagon having a load carrying body 15 of any suitable construction. The body 15 is supported in a manner to be more fully hereinafter described on front and rear axles 16 and 17 respectively. Pairs of ground engaging wheels 18 and 19 are respectively mounted on the axles for rotation relative thereto.

The ground engaging wheels 18 are rotatably supported at opposite ends of the front axle 16 by conventional steering knuckles 19' for turning movement about substantially vertical axes. The steering knuckles 19 are connected together in accordance with the usual practice by a cross link 20 having a pivotal connection 21 intermediate the ends thereof with a drawbar 22. The rear end of the drawbar 22 extends beyond the cross link 20 and is pivoted to the front axle 16 midway between the ends of the latter by a vertical pin 23 in a manner such that movement of the drawbar in opposite directions about the vertical pin 23 effects a turning movement of the ground engaging wheels 18 in corresponding directions.

The front end portion of the vehicle body 15 is releasably supported on the front axle 16 by a pair of brackets 24 secured to the underside of the body at points spaced from each other in the direction of length of the front axle 16 and extending downwardly from the body toward the axle 16. The lower ends of the brackets 24 are bifurcated and are positioned so that the furcations 25 extend at opposite sides of the front axle 16. The arrangement is such that the furcations 25 respectively engage opposite sides of the front axle 16 to provide a driving connection between the latter axle and body while permitting the front end portion of the body to be raised relative to the axle 16.

It will further be noted from the several figures of the drawings that the body 15 is reinforced by a frame 26 comprisng laterally spaced side sills 27 extending in the direction of length of the body and connected together at longitudinally spaced points by cross braces 28. In cases where both the body and frame are formed of metal, it is preferred to weld the two together, although other forms of fastening means may be employed.

The opposite end portions of the front axle 16 are respectively connected to the laterally spaced sills 27 of the frame 26 by links 29. The front end portions of the links 29 are suitably pivoted to the axle 16 for swinging movement about the axis of the latter, and the rear ends of the links 29 are respectively pivoted to the sills 27 by pins 30. The pins 30 extend in alignment with each other parallel to the front axle 16 and are spaced rearwardly from the front axle 16.

The rear end portion of the body 15 is removably supported on the axle 17 by a pair of arms 31 spaced from each other in the direction of the axle 17, and having the lower ends pivoted on the axle 17 for swinging movement about the axis of the latter. As shown in Figure 1 of the drawings, the upper ends of the arms 31 are provided with seats 32 adapted to respectively engage the undersides of the sills 27 to provide a rest for the rear end of the body 15.

The opposite ends of the rear axle 17 are also respectively connected to the body 15 by a pair of links 33 having the rear ends suitably pivotally supported on the axle 17 and having the front ends respectively pivoted to the side sills 27 of the frame 26 by pins 34. The pins 34 extend in alignment with each other parallel to the axle 17, and are spaced forwardly of the axle 17. The rear ends of the links 33 are respectively welded to the lower ends of the arms 31, and the upper ends of the arms 31 are connected to the links 33 intermediate the ends thereof by rods 35.

It will be noted particularly from Figure 6 of the drawings that latch means 36 is provided for locking the rear wheels 19 to the arms 31 and links 33. The latch means 36 comprises a rod 37 which extends transversely of the body 15 beneath the frame 26 in advance of the axle 17. The bar 37 is rotatably supported in a pair of lugs 38 respectively secured to the links 33 intermediate the ends of the latter. Suitable latch elements 39 are respectively secured to the opposite end portions of the rod 36 in positions to engage the peripheral portions of the rubber tires 40 provided on the rear wheels 19. Additional latch elements 41 are respectively secured to the rod 36 opposite the laterally spaced sill members 27 for engagement with suitable keepers 42 secured to the sill members to clamp the body against the seats 32 on the upper ends of the arms 31.

Referring again to Figure 6 of the drawings, it will be noted that the angular relationship between the latch elements 39 and the latch elements 41 is such that when the latch elements 41 are in engagement with their respective keepers 42, the latch elements 39 are released from the rear wheels 19. On the other hand when the rod 36 is rocked in a direction to engage the latch elements 39 with the rear wheels 19, the latch elements 41 are disengaged from the keepers 42. Rocking movement of the rod 36 is effected by a hand grip 43 formed on one extremity of the rod 36 and positioned for convenient manipulation by the operator.

Although the rear wheels 19 are normally freely rotatably supported on the rear axle 17, nevertheless, provision is made herein for selectively securing the rear wheels to the axle 17, so that the latter and wheels will rotate as a unit.

As shown in Figure 1 of the drawings, a pair of clutch members 44 are respectively supported on the axle 17 at the inner sides of the hub portions 45 on the rear wheels 19. The clutch members 44 are keyed to the axle for sliding movement axially of the latter, and are provided with clutch teeth 46 at the outer ends thereof. The clutch teeth 46 are adapted to engage corresponding clutch teeth 47 formed on the inner ends of the wheel hubs 45 in response to outward sliding movement of the hub members 44 relative to the axle 17.

The clutch members 44 are moved into and out of operative engagement with the respective clutch teeth on the wheel hubs from a position at the front end of the vehicle body by a control rod 48. The control rod 48 extends longitudinally of the body 15 beneath the latter, and is journalled in suitable brackets 49 secured to the bottom of the body. The front end of the rod 48 extends beyond the corresponding end of the body, and is provided with a hand grip 50 to enable rotating the rod in opposite directions. The rear end of the rod 48 is connected to the front end of a shaft 51 by a universal joint 52, and the rear end of the shaft 51 is provided with a disc 53. As shown in Figures 1, 8 and 9, the disc 53 is connected to a pair of aligned shafts 54 by cranks 55. The shafts 54 are respectively slidably supported in openings formed in the arms 31 and the free ends of the shafts are respectively connected to the clutch members 44 by operating forks 56. The arrangement is such that rotation of the rod 48 in one direction imparts an outward sliding movement to the clutch members 44 to engage the teeth 46 thereon with the corresponding teeth 47 on the rear wheel hubs 45, and rotation of the control rod 48 in the opposite direction effects a sliding movement of the clutch members 44 in an inward direction to release the rear wheels 19 from the axle.

A drum 58 is secured to the axle 17 intermediate the ends of the latter, and a cable 59 is wound around the drum. One end of the cable is secured to the drum by a clamp 60, and the other end of the cable is connected to the front axle 16 intermediate the ends of the latter. The arrangement is such that when the rear axle 17 and associated ground engaging wheels 19 are rotated in a reverse direction, the cable 59 is wound around the drum, and the front axle 16 is pulled rearwardly by rotation of the drum.

*Operation*

Assuming that the vehicle body 15 is in its normal load carrying position shown in Figure 2 of the drawings, and that it is desired to tilt the body to its dumping position shown in Figure 4 of the drawings, it will be noted that the operator rotates the rod 37 in a direction to disengage the latch elements 41 from the keepers 42. Thus the latch means 36 is operated to release the body 15 from the upper ends of the supporting arms 31 permitting the rear end of the body to be raised off of the seats 32 at the upper ends of the arms. In this connection it will be noted that continued rotation of the rod 37 in the above direction engages the latch elements 39 with the rim portions of the wheels 19, so that rearward movement of the vehicle causes the arms 31 and the links 33 to rotate about the rear axle 17 as a unit with the rear wheels 19. As shown in Figure 3 of the drawings, rotation of the links 33 in a rearward direction about the axle 17 elevates the rear end of the body a distance depending to some extent on the length of the links 33. If desired the extent of rearward swinging movement of the arm 31 and links 33 may be limited by chains 61 having the upper ends attached to the body and having the lower ends respectively attached to the connecting rods 35.

When the rear end of the body is elevated to the position thereof shown in Figure 3, the rod 37 may be rotated in a direction to release the latch elements 39 from the rear wheels 19, and the control rod 48 may be rotated to engage the clutch members 44 with the clutch teeth 47 on the respective wheel hubs 45. Thus the rear wheels 19 are secured to the axle as a unit with the latter. The arrangement is such that continued rearward movement of the vehicle effects a rotation of the drum 58 in a reverse direction, and causes the cable 59 to wind around the drum. As the cable 59 is wound around the drum, the front axle 16 is positioned rearwardly, and the body 15 is swung upwardly by the links 29 to the position shown in Figure 4 of the drawings. In this position the body is tilted at such an angle as to permit the load to be dispensed by the action of gravity through the rear end of the body by swinging the tail gate 62 to its open position.

It is stated above that the links 33 are initially latched to the rear wheels in order to raise the rear end of the body 15 off the rear axle 17. While this procedure is preferred under some conditions of load distribution, it is nevertheless, not essential. In this connection it will be noted that as the front end of the body is swung upwardly by the links 29, an upward thrust is applied to the links 33 sufficient to swing the latter upwardly and raise the rear end of the body relative to the rear axle.

The body may be returned to its normal position shown in Figure 2 of the drawings by releasing the clutch members 44 from engagement with the clutch teeth on the adjacent rear wheels 19, and by exerting a forward pull on the drawbar 22. The application of a forward pull on the drawbar moves the front axle 16 forwardly and unwinds the cable 59 from the drum by rotating the latter together with the rear axle 17. As the front axle 16 moves forwardly, the links 29 are swung downwardly about the pivots 30 and the front end of the body is lowered to again engage the brackets 24 with the front axle. As the forward pull on the drawbar is continued, the links 33 are swung downwardly about the rear axle 17 and the arms 31 are swung upwardly to again position the seats for engagement with the respective sills 27 as the rear end portion of the body is lowered to its normal position. As soon as the rear end portion of the body is reengaged with the seats 32, the latch means 36 is manipulated to engage the elements 41 with the keepers 42, and thereby clamp the rear end of the body in supporting relationship to the arms 31.

In Figures 11 to 13 inclusive, different methods of dumping the vehicle body 15 are illustrated. In Figure 11, for example, the body is swung to its tilted position while maintained in seating engagement with the upper ends of the arms 31. This arrangement may be employed in instances where it is not necessary to provide a substantial clearance between the ground and rear end of the body when the latter is in its tilted position.

In Figure 12 of the drawings, a block or other suitable abutment 65 is employed to prevent reverse rotation of the rear wheels 19 during upward swinging movement of the body 15. When resorting to this method of dumping the body, it is only necessary to operate the latch means 36 to release the elements 41 from the keepers 42, since the rear wheels are prevented from reverse rotation by the abutments 65. Also it is not necessary to manipulate the clutches 44 because the rearward thrust on the drawbar will suffice to swing the body to its tilted position. This particular method of dumping is advantageous where it is necessary to accurately locate the load at a predetermined location.

In Figure 13 of the drawings the abutments 65 may be eliminated, and the rear wheels held from rotation by manipulating the latch means 36 to engage the elements 39 with the rim portions of the wheels 19. In this arrangement the body is tipped by applying a rearward thrust on the drawbar instead of manipulating the cable 59.

Under some conditions it may be advantageous to apply the principles of the dumping mechanism previously described to vehicles of the trailer type. This may be readily accomplished by merely altering the front end construction in the manner indicated in Figures 14 and 15 of the drawings. In detail the numeral 70 indicates the rear wheels of a suitable tractor having a rearwardly extending drawbar 71 and having a relatively short shaft or axle 72 pivoted intermediate the ends thereof on the rear end of the drawbar by a vertical pin 73. The arrangement is such as to permit swinging movement of the drawbar in a substantially horizontal plane about the axis of the pin 73.

The axle 72 provides a support for the front end of the body assembly 15 which may be the same in general construction as the body assembly described above. In this connection it will be noted that a pair of brackets 74 are secured to the bottom of the body adjacent the front end of the latter, and the lower ends of the brackets are bifurcated to respectively receive the opposite end portions of the axle 72. Suitable releasable latching means (not shown) may be provided for normally holding the brackets 74 in assembled relationship with the axle 72.

The axle 72 is also connected at opposite ends to the front ends of the respective links 29 in order to permit upward swinging movement of the body 15 upon rearward movement of the tractor 70 when the rear wheels are either blocked in the manner shown in Figure 12 or are latched in the manner shown in Figure 13 against reverse rotation. It will be understood that in this embodiment of the invention, the cable 59 and associated parts, including the drum 58 and clutch members 44, may be eliminated, if desired.

In some instances it may be advantageous to provide some means for assisting swinging movement of the front end portion of the body in an upward direction from its normal seated position on the front axle. This is particularly true in instances where the cable 59 and associated mechanism is omitted. With the above in view, reference is made to the modified construction shown in Figure 16 of the drawings, wherein it will be noted that the pivoted end portions of the links 29 and 33 are respectively connected by a pair of connecting links 76. In detail the front end portions of the links 76 are formed with elongated slots 77 for receiving suitable pins 78 respectively mounted on the links 29 at points spaced below and forwardly of the pins 30. The rear ends of the links 76 are pivoted to the upper ends of the links 33 by pins 79 spaced above the pins 34.

With the above construction it will be noted that as the upper ends of the links 33 are swung in a rearward direction about the axle 17, the pins 79 are displaced rearwardly about the pins 34, and the links 76 are also moved rearwardly. Since the front end portions of the links 76 are pivoted to the links 29 forwardly and below the pins 30, it follows that rearward displacement of the links 76 applies a lifting force on the front end of the body tending to assist raising of the latter relative to the front axle. In order to further assist the links in lifting or swinging the body, the weight of the latter may be counterbalanced to some extent by a coil spring 80 having the opposite ends respectively connected to the front and rear axles. With the above exception the construction shown in Figure 16 is substantially the same as the one shown in Figures 1 to 13 inclusive, and the same reference numerals are employed to designate corresponding parts of the two embodiments.

What I claim as my invention is:

1. A vehicle comprising a body, first and second axles extending transversely of the body beneath the latter, ground engaging wheels carried by the axles, means supporting the wheels on the second axle for rotation relative to the latter, means for connecting the second axle to at least one of the wheels thereon whereby rotation of the latter imparts a rotative movement to the second axle, and a connection between the first and second axles responsive to rotation to the second axle in one direction to pull the first axle in a direction toward the second axle.

2. A vehicle comprising a body, first and second axles extending transversely of the body beneath the latter, ground engaging wheels carried by the axles, means supporting the wheels on the second axle for rotation relative to the latter, selectively operable means for connecting the second axle to at least one of the wheels thereon whereby rotation of the latter imparts a rotative movement to the second axle, a drum fixed on the second axle for rotation thereby, a flexible linear member having one end fixed to the drum and having the opposite end portion fixed to the first axle for pulling the latter in a direction toward the second axle upon rotation of the second axle in one direction.

3. A vehicle comprising a body, first and second axles extending transversely of the body beneath the latter, ground engaging wheels carried by the axles, means supporting the wheels on the second axle for rotation relative to the latter, means for connecting the second axle to at least one of the wheels thereon whereby rotation of the latter imparts a rotative movement to the second axle, means responsive to rotation of the second axle in one direction to pull the first axle in a direction toward the second axle, and means for swinging the end of the body adjacent the first axle upwardly in response to movement of the first axle toward the second axle.

4. A vehicle comprising a body, front and rear axles extending transversely of the body beneath the latter, ground engaging wheels carried by the axles, means supporting the wheels on the rear axle for rotation relative to the latter, means under the control of the operator for connecting the rear axle to at least one of the rear wheels whereby rotation of the latter imparts a rotative movement to said rear axle, a drum fixed on the rear axle for rotation as a unit with the latter, a flexible linear member having one end fixed to the drum and having the opposite end fixed to the front axle for pulling said front axle rearwardly upon reverse rotation of the rear axle, and means for swinging the front end of the body upwardly in response to rearward displacement of the front axle.

5. A vehicle comprising a body, first and second axles extending transversely of the body beneath the latter, ground engaging wheels carried by the axles, means supporting the wheels on the second axle for rotation relative to the latter, means for connecting the second axle to at least one of the wheels thereon whereby rotation of the latter imparts a rotative movement to the second axle, means responsive to rotation of the second axle in one direction to pull the first axle in a direction toward the second axle, means for elevating the end of the body adjacent the second axle upon initial rotation of the wheels on the second axle in said one direction of rotation, and means for swinging the end of the body adjacent the first axle upwardly in response to movement of the first axle toward the second axle.

6. A vehicle comprising a body, front and rear axles extending transversely of the body beneath the latter, ground engaging wheels carried by the axles, means supporting the wheels on the rear axle for rotation relative to the latter, means under the control of the operator for connecting the rear axle to at least one of the rear wheels whereby rotation of the latter imparts a rotative movement to said rear axle, a drum fixed on the rear axle for rotation as a unit with the latter, a flexible linear member having one end fixed to the drum and having the opposite end fixed to the front axle for pulling said front axle rearwardly upon reverse rotation of the rear axle, means for elevating the rear end of the body upon initial rotation of the rear wheels in the reverse direction aforesaid, and means for swinging the front end of the body upwardly about the rear axle in response to rearward displacement of the front axle.

7. A vehicle comprising a body, front and rear axles extending transversely of the body beneath the latter, ground engaging wheels carried by the axles, means supporting the wheels on the rear axle for rotation relative to the latter, means under the control of the operator for connecting the rear axle to at least one of the rear wheels whereby rotation of the latter imparts a rotative movement to said rear axle, an arm having the lower end pivoted on the rear axle for swinging movement about the axis of the rear axle and having the upper end removably supporting the body, releasable latch means for rotating the arm in a reverse direction in response to initial rotation of the rear axle and associated wheels in a corresponding direction, means responsive to swinging movement of the arm to elevate the rear end of the body, and means responsive to continued rotation of the rear axle and associated wheels to swing the body upwardly about the rear axle.

8. A vehicle comprising a body, first and second axles extending transversely of the body beneath the latter, ground engaging wheels carried by the axles, means supporting the wheels on the second axle for rotation relative to the latter, means for connecting the second axle to at least one of the wheels thereon whereby rotation of the latter imparts a rotative movement to the second axle, and means responsive to rotation of the second axle in one direction to swing the end of the body adjacent the first axle upwardly.

9. A vehicle comprising a body, front and rear axles extending transversely of the body beneath the latter, ground engaging wheels carried by the axles, means supporting the wheels on the rear axle for rotation relative to the latter, means under the control of the operator for connecting the rear axle to at least one of the rear wheels whereby rotation of the latter imparts a rotative movement to said rear axle, and means responsive to rotation of the rear axle in a reverse direction for swinging the front end of the body in an upward direction about the rear axle.

10. A vehicle comprising a body, front and rear axles extending transversely of the body beneath the latter, ground engaging wheels carried by the axles, means removably supporting the front end of the body on said front axle, and means responsive to rotation of the wheels on the rear axle in a reverse direction to raise the front end of the body and to swing the latter upwardly about the rear axle.

11. A vehicle comprising a body, front and rear axles extending transversely of the body beneath the latter, ground engaging wheels carried by the axles, means removably supporting the front end of the body on said front axle, means responsive to initial rotation of the rear wheels in a reverse direction to elevate the rear end of the body relative to the rear axle, and means responsive to continued rotation of the rear wheels in said reverse direction to swing the front end of the body upwardly.

12. A vehicle comprising a body, front and rear axles extending transversely of the body beneath the latter, means removably supporting the body on said axles, a pair of links having the opposite ends respectively pivotally connected to the front axle and body for elevating the front end of the body upon rearward displacement of the front axle, a second pair of links having the opposite ends respectively pivotally connected to the body and rear axle for elevating the rear end portion of the body, and means responsive to swinging movement of the second pair of links in a direction to elevate the rear end portion of the body to apply a lifting force on the front end portion of the body including connecting links having the opposite ends respectively connected to said pairs of links.

13. A vehicle comprising a body, front and rear axles extending transversely of the body beneath the latter and relatively movable in directions toward and away from one another, means removably supporting the body on said axles, a pair of links having the opposite ends respectively pivotally connected to the front axle and to said body, a second pair of links having the opposite ends respectively pivotally connected to the rear axles and body, and a spring having the opposite ends respectively connected to said axles and tending to relatively move the axles in directions toward one another.

ARTHUR RAYMOND CUNNINGHAM.

REFERENCES CITED

The following references are of record in the file of this patent:

UNITED STATES PATENTS

| Number | Name | Date |
|---|---|---|
| 1,969,173 | Hansen | Aug. 7, 1934 |
| 2,309,787 | Quintin et al. | Feb. 2, 1943 |

FOREIGN PATENTS

| Number | Country | Date |
|---|---|---|
| 340,375 | France | July 5, 1904 |